US012748327B2

(12) United States Patent
Lin et al.

(10) Patent No.: US 12,748,327 B2
(45) Date of Patent: Sep. 29, 2026

(54) COMPOSITE COVER PLATE AND DISPLAY DEVICE

(71) Applicant: TPK Touch Solutions (Xiamen) Inc., Xiamen (CN)

(72) Inventors: Shun Long Lin, Xiamen City (CN); Yan Lei Wang, Xianyou County (CN); Yi Duan Zhou, Xiamen City (CN)

(73) Assignee: TPK Touch Solutions (Xiamen) Inc., Xiamen (CN)

( * ) Notice: Subject to any disclaimer, the term of this patent is extended or adjusted under 35 U.S.C. 154(b) by 111 days.

(21) Appl. No.: 18/639,110

(22) Filed: Apr. 18, 2024

(65) Prior Publication Data

US 2024/0419026 A1 Dec. 19, 2024

(30) Foreign Application Priority Data

Jun. 14, 2023 (CN) ......................... 202310705746.1

(51) Int. Cl.
*G02F 1/1333* (2006.01)
*G02F 1/137* (2006.01)
(Continued)

(52) U.S. Cl.
CPC ...... *G02F 1/13338* (2013.01); *G02F 1/13718* (2013.01); *G02F 1/167* (2013.01); *H04M 1/0283* (2013.01); *H04M 2250/22* (2013.01)

(58) Field of Classification Search
None
See application file for complete search history.

(56) References Cited

U.S. PATENT DOCUMENTS

2003/0095219 A1* 5/2003 Lee .................. G02F 1/133512 349/110
2014/0300835 A1* 10/2014 Chu ...................... G06F 3/0446 349/12
(Continued)

FOREIGN PATENT DOCUMENTS

CN 208432976 U 1/2019
CN 209231895 U 8/2019
(Continued)

OTHER PUBLICATIONS

European Search Report cited in EP24177844.8, mailed Nov. 4, 2024, 9 pages.

*Primary Examiner* — Nicholas J Lee
(74) *Attorney, Agent, or Firm* — Cooper Legal Group, LLC

(57) ABSTRACT

A composite cover plate has a peripheral area located on at least one side of a viewable area, and comprises a plastic substrate, a decorative layer, a supporting layer, and a shielding layer. The plastic substrate has a haze from 10-30% and a thickness from 50-250 μm. The decorative layer is attached to the plastic substrate, has a thickness from 16-24 μm and an optical density from 1.5-2.5. The peripheral area of the composite cover plate is defined by a vertical projection of the decorative layer. The supporting layer has an upper layer surface and a lower layer surface. The upper layer surface is adhered to the plastic substrate and the decorative layer. The shielding layer is attached to the lower layer surface and has an optical density from 5.0-6.2. The L* of CIELAB color space of the peripheral area measured via the plastic substrate is from 90-96.

20 Claims, 6 Drawing Sheets

(51) Int. Cl.
*G02F 1/167* (2019.01)
*H04M 1/02* (2006.01)

(56) References Cited

U.S. PATENT DOCUMENTS

| | | | | |
|---|---|---|---|---|
| 2014/0367242 | A1 | 12/2014 | Chen et al. | |
| 2016/0146975 | A1* | 5/2016 | Lu | B05D 3/0272 427/256 |
| 2018/0252862 | A1 | 9/2018 | Shei et al. | |
| 2019/0165324 | A1* | 5/2019 | Zhou | G06F 1/1637 |
| 2019/0243494 | A1* | 8/2019 | Zhang | G06F 3/0412 |
| 2019/0258107 | A1* | 8/2019 | Fujii | G02F 1/133308 |
| 2021/0389835 | A1* | 12/2021 | Lee | G06F 3/041 |
| 2021/0396912 | A1 | 12/2021 | Yan et al. | |
| 2022/0176821 | A1 | 6/2022 | Hart et al. | |
| 2023/0213798 | A1* | 7/2023 | Murata | G02F 1/13306 349/59 |

FOREIGN PATENT DOCUMENTS

| | | | |
|---|---|---|---|
| CN | 108323056 | B | 4/2020 |
| TW | M469546 | U | 1/2014 |
| TW | I707258 | B | 10/2020 |

* cited by examiner

COMPOSITE COVER PLATE AND DISPLAY DEVICE

CROSS-REFERENCE TO RELATED APPLICATION

This application claims priority to Chinese Patent Application 202310705746.1, filed Jun. 14, 2023, which is incorporated herein by reference.

FIELD OF DISCLOSURE

The present disclosure relates to a composite cover plate and a display device.

DESCRIPTION OF RELATED ART

With the bloom of smart phones and tablets, touch panels for such types of handheld electronic devices are in great demand and short supply, leading manufacturing industries to constantly conduct research and development in order to improve technology of relevant manufacturing processes, hoping to reduce production costs and achieve higher productivity. In general, a touch panel needs to be covered with a layer of protective cover, which is treated with tempering, to protect a touch sensor of the touch panel located thereunder from damage caused by scratches, fingerprints, and stains. Furthermore, protective glass that is specifically made for touch and display functions of handheld electronic devices shall be light weight, slim, anti-pressure, drop-proof, and have higher light transmittance.

For protective cover plates of the prior art, the thickness of the decorative layer needs to be increased in order to achieve sufficient brightness and shielding effect in the peripheral area. However, if a decorative layer is too thick, the decorative layer may prohibit the protective cover plate from thinning the thickness thereof and, in some cases, may cause warping problems in the peripheral area.

Therefore, to introduce a solution that can solve the aforementioned problems of composite cover plates and display devices is what the industry invests its research and development resources in and intends to achieve.

SUMMARY

In view of this, one objective of the present disclosure is to provide a composite cover plate and a display device that can resolve the aforementioned problems.

To achieve the aforementioned objective, according to one of the embodiments of the present disclosure, a composite cover plate has a viewable area and a peripheral area located on at least one side of the viewable area, and comprises a plastic substrate, a decorative layer, a supporting layer, and a shielding layer. The plastic substrate has a haze ranging from 10% to 30% and has a thickness ranging from 50 μm to 250 μm. The decorative layer is attached to a surface of the plastic substrate, with a thickness ranging from 16 μm to 24 μm and an optical density ranging from 1.5 to 2.5. The peripheral area of the composite cover plate is defined by a vertical projection of the decorative layer. The supporting layer has an upper layer surface and a lower layer surface. The upper layer surface is adhered to the plastic substrate and the decorative layer. The shielding layer is attached to the lower layer surface and has an optical density ranging from 5.0 to 6.2. An L* of CIELAB color space of the peripheral area of the composite cover plate measured via the plastic substrate is within a range from 90 to 96.

In one or more embodiments of the present disclosure, the peripheral area has a gloss ranging from 30 GU to 75 GU.

In one or more embodiments of the present disclosure, the plastic substrate has a pencil hardness ranging from 3H to 6H.

In one or more embodiments of the present disclosure, the shielding layer has a thickness ranging from 6 μm to 20 μm, or a preferable thickness ranging from 8 μm to 12 μm.

To achieve the aforementioned objective, according to one of the embodiments of the present disclosure, a display device comprises a composite cover plate and a display module. The composite cover plate has a viewable area and a peripheral area located on at least one side of the viewable area, and comprises a plastic substrate, a decorative layer, a supporting layer, and a shielding layer. The plastic substrate has a haze ranging from 10% to 30% and has a thickness ranging from 50 μm to 250 μm. The decorative layer is attached to a surface of the plastic substrate, with a thickness ranging from 16 μm to 24 μm, and has an optical density ranging from 1.5 to 2.5. The peripheral area of the composite cover plate is defined by a vertical projection of the decorative layer. The supporting layer has an upper layer surface and a lower layer surface. The upper layer surface is adhered to the plastic substrate and the decorative layer. The shielding layer is attached to the lower layer surface and has an optical density ranging from 5.0 to 6.2. The display module is disposed on one side of the supporting layer away from the plastic substrate. The L* of CIELAB color space of the peripheral area of the composite cover plate measured via the plastic substrate is within a range from 90 to 96.

In one or more embodiments of the present disclosure, the peripheral area has a gloss ranging from 30 GU to 75 GU.

In one or more embodiments of the present disclosure, the plastic substrate has a pencil hardness ranging from 3H to 6H.

In one or more embodiments of the present disclosure, the shielding layer has a thickness ranging from 6 μm to 20 μm, or a preferable thickness ranging from 8 μm to 12 μm.

In one or more embodiments of the present disclosure, the display module is a reflective display device, for example, an electronic ink display device or a cholesteric liquid crystal display (ChLCD) device.

In one or more embodiments of the present disclosure, the display device further comprises a touch module. The touch module is disposed between the composite cover plate and the display module.

To achieve the aforementioned objective, according to one of the embodiments of the present disclosure, a display device comprises a composite cover plate, a front light guide module, and a display module. The composite cover plate comprises a plastic substrate, a decorative layer, a supporting layer, and a shielding layer. The plastic substrate has a haze ranging from 10% to 30% and has a thickness ranging from 50 μm to 250 μm. The decorative layer is attached to a surface of the plastic substrate, with a thickness ranging from 16 μm to 24 μm, and has an optical density ranging from 1.5 to 2.5. A peripheral area of the composite cover plate is defined by a vertical projection of the decorative layer. The supporting layer has an upper layer surface and a lower layer surface. The upper layer surface is adhered to the plastic substrate and the decorative layer. The shielding layer is attached to the lower layer surface and has an optical density ranging from 5.0 to 6.2. The composite cover plate also has a viewable area that is connected to the peripheral area. The front light guide module is disposed on one side of the supporting layer away from the plastic substrate. The display module is disposed on one side of the front light guide module away from the composite cover plate. When the front light guide module is turned on, the luminance of the viewable area of the display device measured via the plastic substrate is within a range from 100 nits to 140 nits.

In one or more embodiments of the present disclosure, the L* of CIELAB color space of the peripheral area of the composite cover plate measured via the plastic substrate is within a range from 90 to 96.

In one or more embodiments of the present disclosure, the shielding layer has a thickness ranging from 6 μm to 20 μm, or a preferable thickness in a range from 8 μm to 12 μm.

In one or more embodiments of the present disclosure, the display module is an electronic ink display device or a cholesteric liquid crystal display (ChLCD) device.

In one or more embodiments of the present disclosure, the display device further comprises a touch module. The touch module is disposed between the composite cover plate and the display module.

In summary, in the composite cover plate and the display device of the present disclosure, the decorative layer can achieve a decoration effect sufficiently through limiting the thickness and the optical density of the decorative layer. Furthermore, the peripheral area of the composite cover plate can achieve sufficient brightness through limiting the haze and the thickness of the plastic substrate. The total thickness of the composite cover plate can be reduced effectively by disposing the decorative layer and the shielding layer separately, thereby effectively preventing the peripheral area of the composite cover plate from being warped.

The aforementioned statements are used for explaining the problems that can be solved by the present disclosure, the technical means for solving the problems, and the effect thereof. As for specific details of the present disclosure, detailed descriptions will be given hereinafter through the explanations for the implementation methods and relevant drawings.

BRIEF DESCRIPTION OF THE DRAWINGS

To better understand the aforementioned objective and other objectives, novel features, advantages, embodiments, and the effect of the present disclosure, relevant diagrams are provided as follows.

DETAILED DESCRIPTION

Figure 1:
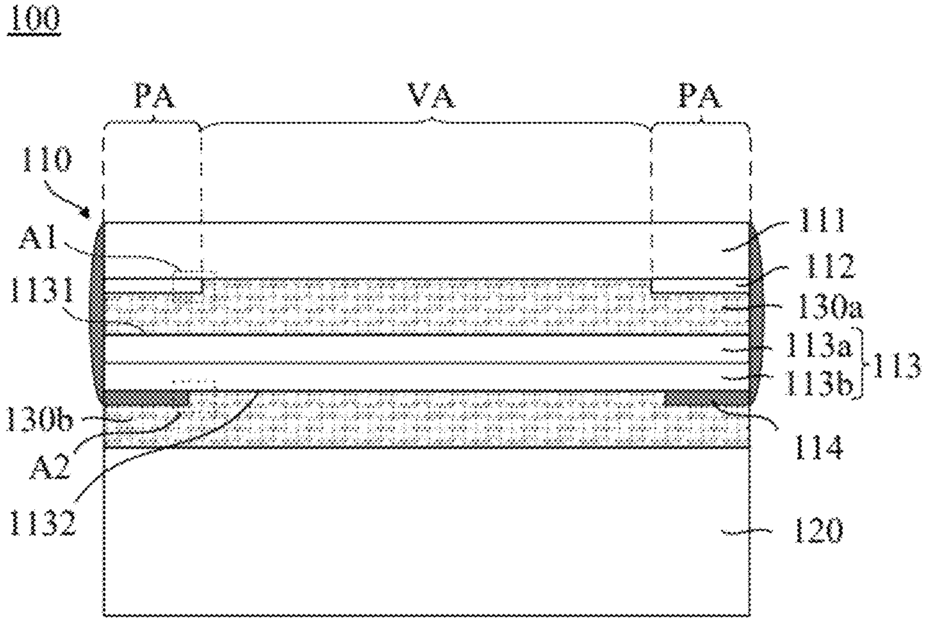
FIG. 1 is a schematic diagram of the display device of an embodiment of the present disclosure.

A plurality of embodiments of the present disclosure will be disclosed below by referring to the drawings. For purpose of clear illustration, many details in practice will be provided together with the following descriptions. However, these detailed descriptions in practice are for illustration only and shall not be interpreted to limit the scope, applicability, or configuration of the present disclosure in any way. That is, in some embodiments of the present disclosure, these details in practice are not necessary. Furthermore, for the purpose of simplifying drawings, some structures and components of the prior art shown in the drawings will be illustrated schematically.

Please refer to FIG. 1. FIG. 1 is a schematic diagram of the display device 100 of an embodiment of the present disclosure. As shown in FIG. 1, the display device 100 comprises a composite cover plate 110 and a display module 120. The composite cover plate 110 comprises a plastic substrate 111, a decorative layer 112, a supporting layer 113, and a shielding layer 114. The plastic substrate 111 has a haze in a range from 10% to 30%. The plastic substrate 111 has a thickness ranging from 50 μm to 250 μm. For example, the thickness of the plastic substrate 111 is about, but not limited to, 75 μm.

In some embodiments, the plastic substrate 111 is an anti-glare (AG) film. The AG film is a type of transparent thin film that is commonly used in a display device or on a screen and is designed to reduce dazzling glare. Glare is caused by the reflected light on the screen surface, which can cause headaches, asthenopia, and reduce work efficiency. AG Film is a hard-coated (HC) transparent film which undergoes an atomization process, so that the induced reflection becomes blurry (light scattering) in order to achieve the anti-glare effect.

In some embodiments, the plastic substrate III has a pencil hardness ranging from 3H to 6H.

Please refer to Table 1 shown below. The patent applicant provided a type of composite cover plate 110 for experiments and obtained multiple optical measurement parameters for the composite cover plate 110.

TABLE 1

| Property | Unit | Specification | Measurement Standard | Remarks |
|---|---|---|---|---|
| Transmittance | % | >87.5 | ASTM D1003 | Wavelength: 380-700 nm |
| Haze | % | <29 | ASTM D1003 | |
| Gloss | GU | <55 | ASTM D1003 | Measurement angle: 60° |
| b* | CIELAB | <1.2 | ASTM D2244-21 | |
| UV Cut | % | <0.2 (<360 nm) <2 (360-370 nm) <20 (370-380 nm) | | Wavelength: <380 nm |

What needs to be explained is that the ASTM D1003 in Table 1 is a standard test method enacted by American Society for Testing and Materials (ASTM). Such a test method is applicable for luminous transmittance, haze, and gloss of transparent plastics (for example, composite cover plate 110).

In some embodiments, the decorative layer 112 is, but is not limited to, a white ink layer. Thus, when users observe the composite cover plate 110 from one side of the plastic substrate 111, the white ink layer poses an effect of white color for users.

Figure 2A:
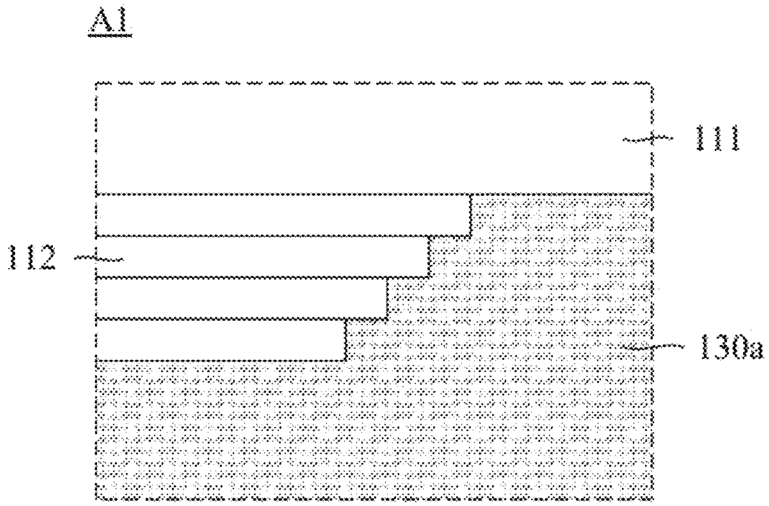
FIG. 2A is a partial enlarged view of the display device of the present disclosure described in FIG. 1.

In some embodiments, the decorative layer 112 can be formed on the lower surface of the plastic substrate 111 through a printing process. Please refer to FIG. 2A, which is a partially enlarged view of area A1 of the display device 100 of the present disclosure described in FIG. 1. As shown in FIG. 2A, the decorative layer 112 is, for example, composed of a plurality of ink layers that are sequentially printed by the printing process and stacked together. For instance, the number of ink layers of the decorative layer 112 is four while the thickness of each ink layer of the decorative layer 112 is, but is not limited to, within a range from 4 μm to 6 μm.

During the practical implementation, the number of ink layers of the decorative layer 112 and the thickness of each ink layer of the decorative layer 112 can be adjusted flexibly according to actual requirements or conditions limited by the production process.

As shown in FIG. 1, the decorative layer 112 is attached to the lower surface of the plastic substrate 111. The decorative layer 112 has an optical density (OD) ranging from 1.5 to 2.5, and the decorative layer 112 has a thickness ranging from 16 μm to 24 μm.

The decorative layer 112 can achieve a decoration effect sufficiently through limiting the thickness and the optical density of the decorative layer 112. For example, under the aforementioned optical density conditions, when the thickness of the decorative layer 112, produced by means of the printing process, is less than 16 μm, the decorative layer 112 may have problems of paint pinholes and show a lesser white color. What is more, when the thickness of the decorative layer 112 is larger than 24 μm, the white color effect from the decorative layer 112 cannot be significantly enhanced further and, on the contrary, may affect the overall transmittance of the composite cover plate 110.

Moreover, by further limiting the haze (namely the haze ranging from 10% to 30%) and the thickness (namely the thickness ranging from 50 μm to 250 μm) of the plastic substrate 111, the peripheral area (PA) of the composite cover plate 110 can reach sufficient brightness. For instance, the L* of CIELAB color space of the peripheral area PA of the composite cover plate 110 measured via the plastic substrate 111 is within a range from 90 to 96, where the L* stands for perceptual lightness. CIELAB color space also includes a* and b*, where a* and b* stand for the four unique colors of human vision: red, green, blue, and yellow.

In some embodiments, the peripheral area PA of the composite cover plate 110 has a gloss within a range from, but not limited to, 30 GU to 75 GU.

In some embodiments, each ink layer of the decorative layer 112 extends from the edge of the plastic substrate 111 toward the viewable area VA.

In some embodiments, the extended distance of which the decorative layer 112 extends from the edge of the plastic substrate 111 toward the viewable area VA is, but is not limited to, within a range from 7 mm to 9 mm.

In some embodiments, as shown in FIG. 2A, the next ink layer within the decorative layer 112 has an inward step length ranging from, but not limited to, 0.05 mm to 0.25 mm away from the viewable area VA with respect to the adjacent previous ink layer. The aforementioned inward step length is provided for the process tolerances in the printing process, to prevent the edges of the decorative layer 112 from unprecise positioning.

As shown in FIG. 1. The supporting layer 113 is adhered to the plastic substrate 111 and the decorative layer 112 (for example, by using an adhesive 130*a*). The supporting layer 113 is to enhance the overall structural strength of the plastic substrate 111.

In some embodiments, the supporting layer 113 can be made of two types of materials; for instance, one for the upper layer 113*a* and one for the lower layer 113*b*. For example, the material of one component from the upper layer 113*a* or the lower layer 113*b* includes poly carbonate (PC), and the material of the other component from the upper layer 113*a* or the lower layer 113*b* includes polymethyl methacrylate (PMMA). However, the present disclosure is not limited thereto.

In some embodiments, the material of the supporting layer 113 includes glass. However, the present disclosure is not limited thereto.

In some embodiments, the adhesive 130*a*, for instance, is optical clear adhesive (OCA). However, the present disclosure is not limited thereto.

As shown in FIG. 1, the shielding layer 114 is attached to the lower layer surface 1132 of the supporting layer 113. The shielding layer 114 has an optical density ranging from 5.0 to 6.2. The peripheral area PA of the composite cover plate 110 is defined by a vertical projection of the decorative layer 112. The composite cover plate 110 also has a peripheral area PA that is connected to the viewable area VA. In other words, the viewable area VA is defined as the area of the composite cover plate 110 that does not overlap with the vertical projection of the decorative layer 112.

As described, the decorative layer 112 is formed on the lower surface of the plastic substrate 111, and the shielding layer 114 is attached to the lower layer surface 1132 of the supporting layer 113. In other words, the decorative layer 112 and the shielding layer 114 are at least separated by the supporting layer 113. The total thickness of the composite cover plate 110 can be reduced effectively by disposing the decorative layer 112 and the shielding layer 114 separately (allowing a thinner layer of adhesive 130*a* to be applied), thereby effectively preventing the peripheral area PA of the composite cover plate 110 from being warped.

In some embodiments, the shielding layer 114 is, but is not limited to, a black ink layer. Thus, when users observe the composite cover plate 110 from one side of the plastic substrate 111, the black ink layer can block the view of wiring in the display module 120 disposed thereunder in the peripheral area PA from users.

In some embodiments, the shielding layer 114 has a thickness in a range from 6 μm to 20 μm, or a preferable thickness ranging from 8 μm to 12 μm. However, the present disclosure is not limited thereto.

Figure 2B:
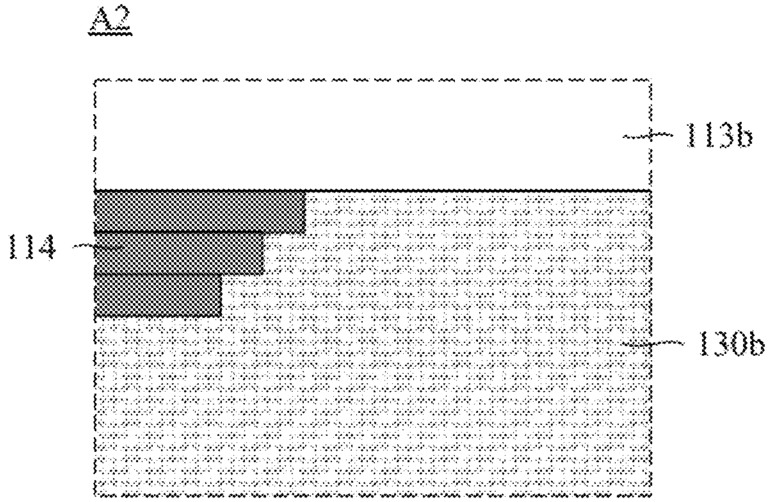
FIG. 2B is another partial enlarged view of the display device of the present disclosure described in FIG. 1.

In some embodiments, the shielding layer 114 can be formed on the lower layer surface 1132 of the supporting layer 113 through the printing process. Please refer to FIG. 2B, which is a partially enlarged view of the area A2 of the display device 100 of the present disclosure described in FIG. 1. As shown in FIG. 2B, the shielding layer 114, for example, is composed of a plurality of ink layers that are sequentially printed by the printing process and stacked together. For instance, the number of ink layers of the shielding layer 114 is three, and the thickness of each ink layer of the shielding layer 114 is, but is not limited to, within a range from 4 μm to 6 μm.

During practical implementations, the number of ink layers of the shielding layer 114 and the thickness of each ink layer of the shielding layer 114 can be adjusted flexibly according to actual requirements or conditions limited by the production process.

In some embodiments, each ink layer of the shielding layer 114 extends from the edge of the supporting layer 113 toward the viewable area VA.

As shown in FIG. 1, the extended distance of which the shielding layer 114 extends from the edge of the supporting layer 113 toward the viewable area VA is smaller than the extended distance of which the decorative layer 112 extends from the edge of the plastic substrate 111 toward the viewable area VA (namely the shielding layer 114 has a more significant inward step effect than that of the decorative layer 112). Thus, when users observe the composite cover plate 110 from one side of the plastic substrate 111, users will only see the decorative layer 112 that appears white in color, without noticing the shielding layer 114 that appears black in color. For example, the extended distance of which the shielding layer 114 extends from the edge of the supporting layer 113 toward the viewable area VA is, but is not limited to, smaller than 7 mm.

In some embodiments, as shown in FIG. 2B, the next ink layer within the shielding layer 114 has an inward step length ranging from, but not limited to, 0.05 mm to 0.25 mm away from the viewable area VA with respect to the adjacent previous ink layer. The aforementioned inward step length is provided for the process tolerances of the printing process, to prevent the edges of the shielding layer 114 from unprecise positioning.

In some embodiments, as shown in FIG. 1, the shielding layer 114 further extends from the lower layer surface 1132 of the supporting layer 113 to one side of the supporting layer 113, the adhesive 130*a*, the decorative layer 112, and the plastic substrate 111.

As shown in FIG. 1, the display module 120 is disposed on one side of the supporting layer 113 away from the plastic substrate 111. For example, the display module 120 is adhered to the lower layer surface 1132 of the supporting layer 113 by using an adhesive 130*b*.

In some embodiments, the adhesive 130*b*, for example, is optical clear adhesive. However, the present disclosure is not limited thereto.

Please refer to Table 2 shown below. The patent applicant provided a type of composite cover plate 110 for experiments, and then obtained multiple optical measurement parameters of the composite cover plate 110. Test data were collected from different locations of the peripheral area PA measured through the plastic substrate 111.

TABLE 2

| Measure Point | L* | a* | b* | ΔE | Gloss | Shielding Layer Optical Density (OD) |
|---|---|---|---|---|---|---|
| 01 | 94.46 | −1.15 | 0.23 | 1.10 | 47.80 | 6.78 |
| 02 | 94.56 | −1.15 | 0.15 | 1.00 | 48.80 | 6.11 |
| 03 | 94.42 | −1.17 | 0.06 | 1.14 | 47.80 | 5.76 |
| 04 | 94.43 | −1.16 | 0.06 | 1.13 | 49.00 | 5.93 |
| 05 | 94.40 | −1.19 | 0.04 | 1.17 | 48.70 | 6.04 |

In some embodiments, the display module 120 is a reflective display device; for example, an electronic ink display device or a cholesteric liquid crystal display device. However, the present disclosure is not limited thereto.

Figure 3:
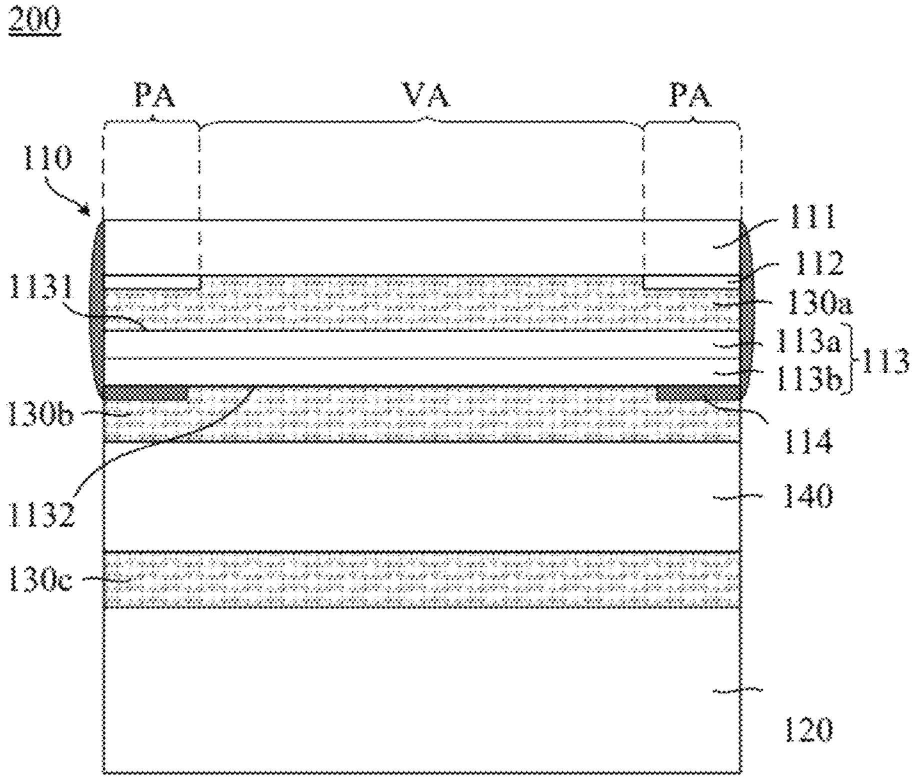
FIG. 3 is a schematic diagram of the display device of another embodiment of the present disclosure.

Please refer to FIG. 3, which is a schematic diagram of the display device 200 of another embodiment of the present disclosure. As shown in FIG. 3, the display device 200 comprises a composite cover plate 110, a display module 120, and a touch module 140, wherein the composite cover plate 110 and the display module 120 are the same as those of the embodiment described in FIG. 1. Therefore, relevant explanations of these components can be found in the aforementioned descriptions and will not be repeated again herein. In comparison to the embodiment shown in FIG. 1, the display device 100 of the embodiment further includes a touch module 140. The touch module 140 is disposed between the composite cover plate 110 and the display module 120. More specifically, the touch module 140 is adhered to the lower layer surface 1132 of the supporting layer 113 by using an adhesive 130*b*, and is adhered to the upper layer surface of the display module 120 by using an adhesive 130*c*. Thus, the display device 200 of the embodiment can provide touch functions to users.

In some embodiments, the touch module 140 is, but is not limited to, a glass-film-film (GFF) type of touch module 140. During practical implementations, the touch module 140 can be a glass-film (GF) touch module 140, a glass-film-double side (GF2) touch module 140, a one-glass-solution single-sided indium tin oxide (ITO) (OGS-SITO) touch module 140, or other types of touch modules 140.

Figure 4:
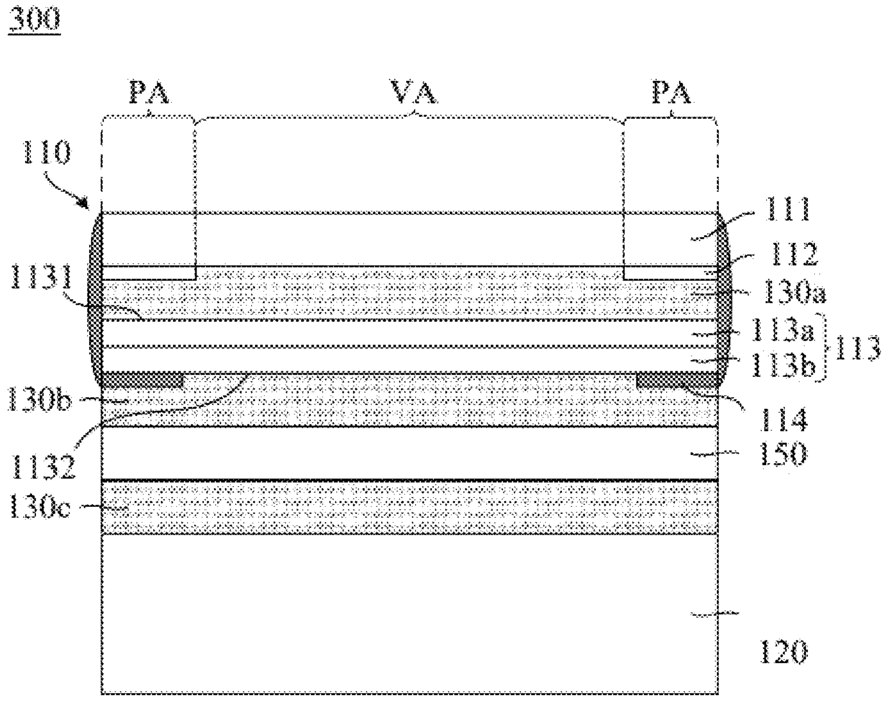
FIG. 4 is a schematic diagram of the display device of another embodiment of the present disclosure.

Please refer to FIG. 4, which is a schematic diagram of the display device 300 of another embodiment of the present disclosure. As shown in FIG. 4, the display device 300 comprises a composite cover plate 110, a front light guide module 150, and a display module 120, wherein the composite cover plate 110 and the display module 120 are the same as those of the embodiment described in FIG. 1. Therefore, relevant explanations of these components can be found in the aforementioned descriptions and will not be repeated again herein. In comparison to the embodiment shown in FIG. 1, the display device 300 of the embodiment further includes a front light guide module 150. More specifically, the front light guide module 150 is adhered to the lower layer surface 1132 of the supporting layer 113 by using an adhesive 130*b* and is adhered to the upper layer surface of the display module 120 by using an adhesive 130*c*. Thus, the front light guide module 150 is configured to guide the light to the display module 120, and the light is then reflected by the display module 120 outward. The front light guide module 150 can be used in an environment of poor lighting. The designs of soft front light will only illuminate the reading surface, which provide users with a lighting environment for reading without disturbing neighboring individuals. For example, when the front light guide module 150 is turned on, luminance of the viewable area VA of the display device 300 measured via the plastic substrate 111 is within a range from 100 nits to 140 nits.

Figure 5:
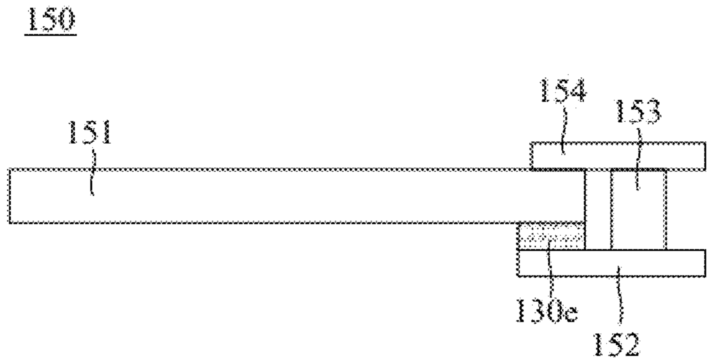
FIG. 5 is another schematic diagram of the front light guide module described in FIG. 4.

Please refer to FIG. 5 which is another schematic diagram of the front light guide module 150 described in FIG. 4. As shown in FIG. 5, the front light guide module 150 comprises a light guide plate 151, a circuit board 152, a light source 153, and an adhesive tape 154. The upper surface of the light guide plate 151 is adhered to the lower layer surface 1132 of the supporting layer 113 by using an adhesive 130*b*, and the lower surface of the light guide plate 151 is adhered to the upper surface of the display module 120 by using an adhesive 130*c*. The circuit board 152 is adhered to the lower surface of the light guide plate 151 by using an adhesive 130*e*. The light source 153 is disposed on the circuit board 152 and is configured to transmit light toward the side of the light guide plate 151. The adhesive tape 154 is adhered to the upper surface of the light guide plate 151 and the upper surface of the light source 153.

In some embodiments, the light source 153 is, but is not limited to, a light-emitting diode (LED).

In some embodiments, the color of the adhesive tape 154 is, but is not limited to, white.

Figure 6:
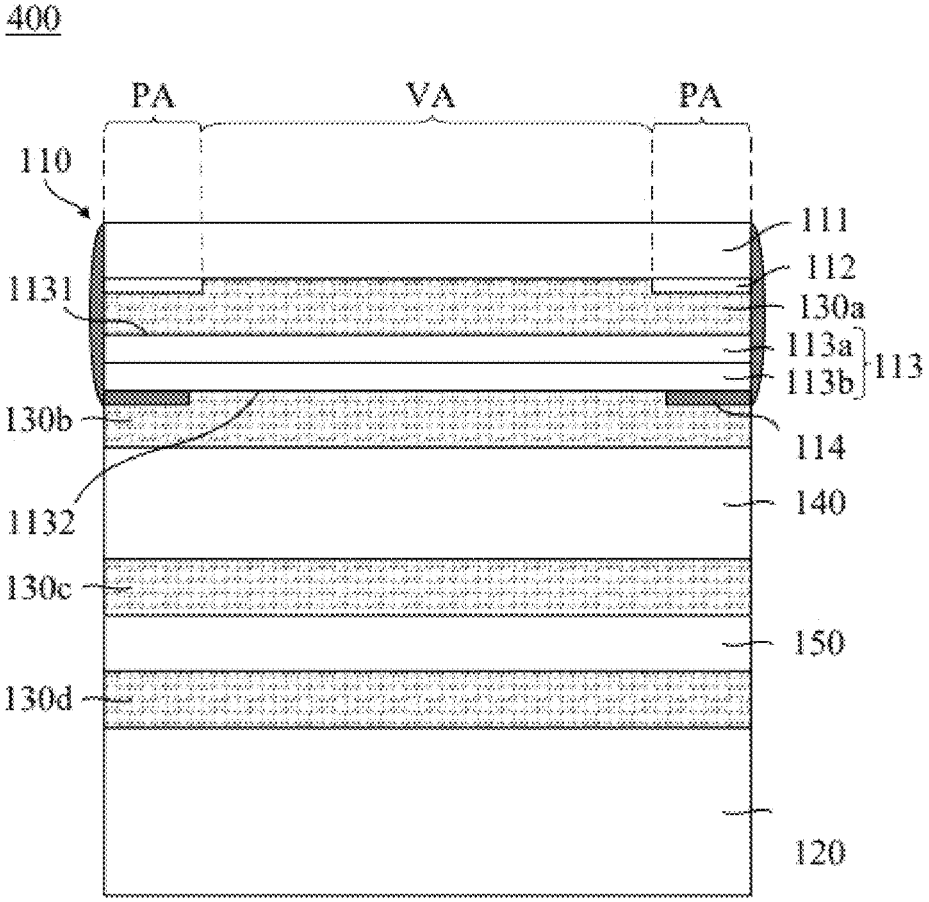
FIG. 6 is a schematic diagram of the display device of another embodiment of the present disclosure.

Please refer to FIG. 6 which is a schematic diagram of the display device 400 of another embodiment of the present disclosure. As shown in FIG. 6, the display device 400 comprises a composite cover plate 110, a touch module 140, a front light guide module 150, and a display module 120, wherein the composite cover plate 110, the display module 120, and the touch module 140 are the same as those of the embodiment described in FIG. 3. Therefore, relevant explanations of these components can be found in the aforementioned descriptions and will not be repeated again herein. In comparison to the embodiment shown in FIG. 3, the display device 400 of the embodiment further includes a front light guide module 150. More specifically, the front light guide module 150 is adhered to the lower surface of the touch module 140 using an adhesive 130*c* and is adhered to the upper surface of the display module 120 using an adhesive 130*d*.

Figure 7:
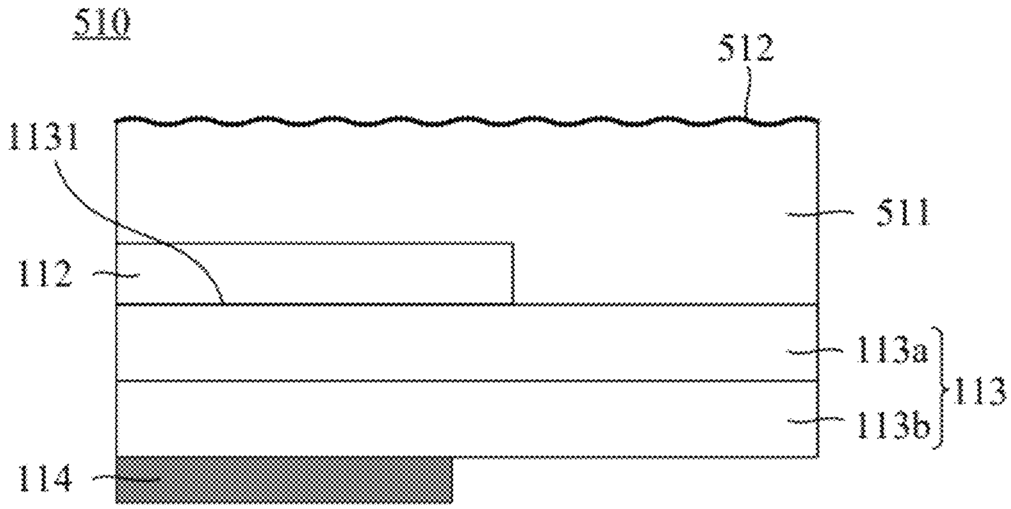
FIG. 7 is a partial view of the composite cover plate of another embodiment of the present disclosure.

Please refer to FIG. 7, which is a partial view of the composite cover plate 510 of another embodiment of the present disclosure. As shown in FIG. 7, the composite cover plate 510 comprises a fill layer 511, an anti-glare coating layer 512, a decorative layer 112, a supporting layer 113, and a shielding layer 114, wherein the decorative layer 112, the supporting layer 113, and the shielding layer 114 are the same as those of the embodiment described in FIG. 1. Therefore, relevant explanations of these components can be found in the aforementioned descriptions and will not be repeated again herein. In comparison to the embodiment shown in FIG. 1, the composite cover plate 510 replaces the combination of the plastic substrate 111 and the adhesive 130*a* with the combination of the fill layer 511 and the anti-glare coating layer 512. More specifically, in this embodiment, the decorative layer 112 is disposed directly on the upper layer surface 1131 of the supporting layer 113. When the supporting layer 113 is made of two types of materials (namely including the upper layer 113*a* and the lower layer 113*b*), the decorative layer 112 can be disposed on the upper layer 113*a*. The fill layer 511 is attached to the upper layer 113*a* and the decorative layer 112. The fill layer 511 can fill the step length difference between the upper layer 113*a* and the decorative layer 112, and the material characteristics of the fill layer 511 can match those of the upper layer 113*a* and the decorative layer 112. The anti-glare coating layer 512 is disposed on one side of the fill layer 511 away from the supporting layer 113, thereby preventing the problems of poor adhesive strength that may occur when the anti-glare coating layer 512 is pasted on the upper layer 113*a* of the supporting layer 113 and the decorative layer 112. Furthermore, the decorative layer 112 and the shielding layer 114 are separated by the supporting layer 113.

In some embodiments, the fill layer 511 comprises, but is not limited to, thermoset transparent materials or ultraviolet (UV) light curing transparent materials.

What needs to be explained is that the composite cover plate 510 shown in FIG. 7 at least has the following advantages: (1) the decorative layer 112 is positioned much closer to a user and can display a higher brightness; thus, when the optical properties of the decorative layer 112 are measured, the distance between the measure point and the decorative layer 112 can be shortened; (2) the decorative layer 112 is away from the light emitted by the front light guide module 150, and as a result, the edge glow of the viewable area VA reduces; when the user is using the touch function, the distance between the finger touch location and the touch module 140 is reduced; and (3) a layer of plastic substrate 111 is omitted and the composite cover plate 110 still can maintain the originally specified properties, including haze, gloss, and surface hardness.

Based on the detail descriptions of the specific embodiments of the present disclosure, it is apparently that, using the composite cover plate and the display device of the present disclosure, the decorative layer can achieve a decoration effect sufficiently through limiting the thickness and the optical density of the decorative layer. Furthermore, the peripheral area of the composite cover plate can achieve sufficient brightness through limiting the haze and the thickness of the plastic substrate. The total thickness of the composite cover plate can be reduced effectively by disposing the decorative layer and the shielding layer separately, thereby effectively preventing the peripheral area of the composite cover plate from being warped.

The above preferred embodiments are presented to disclose the present disclosure and shall not be interpreted to limit the scope, applicability, or configuration, of the present disclosure in any way. Those skilled in the art may use any alternative embodiments that are modified or changed without departing from the spirit and scope of the present disclosure and shall be included in the appended claims.

COMPONENT SYMBOLS

100, 200, 300, 400: display device
110, 510: composite cover plate
111: plastic substrate
112: decorative layer
113: supporting layer
**113*a***: upper layer
1131: upper layer surface
**113*b***: lower layer
1132: lower layer surface
114: shielding layer
120: display module
**130*a*, 130*b*, 130*c*, 130*d*, 130*e***: adhesive
140: touch module
150: front light guide module
151: light guide plate
152: circuit board
153: light source
154: adhesive tape
511: fill layer
512: anti-glare coating layer
A1, A2: area
VA: viewable area
PA: peripheral area

What is claimed is:

1. A composite cover plate, having a viewable area and a peripheral area located on at least one side of the viewable area and comprising:

a plastic substrate, having a haze in a range from 10% to 30% and a thickness ranging from 50 μm to 250 μm;

a decorative layer, attached to a surface of the plastic substrate, the decorative layer having a thickness ranging from 16 μm to 24 μm and an optical density ranging from 1.5 to 2.5, wherein the peripheral area of the composite cover plate is defined by a vertical projection of the decorative layer;

a supporting layer comprising a first layer comprising poly carbonate (PC) and a second layer comprising polymethyl methacrylate (PMMA), the first layer having an upper layer surface and the second layer having a lower layer surface, wherein the upper layer surface is adhered to the plastic substrate and the decorative layer; and a shielding layer, attached to the lower layer surface, the shielding layer having an optical density ranging from 5.0 to 6.2, wherein an L* of CIELAB color space of the peripheral area of the composite cover plate measured via the plastic substrate is within a range from 90 to 96, and wherein the shielding layer is in contact with a sidewall of the first layer and a sidewall of the second layer.

2. The composite cover plate as claimed in claim 1, wherein the peripheral area has a gloss ranging from 30 GU to 75 GU.

3. The composite cover plate as claimed in claim 1, wherein the plastic substrate has a pencil hardness ranging from 3H to 6H.

4. The composite cover plate as claimed in claim 1, wherein the shielding layer has a thickness ranging from 6 μm to 20 μm.

5. A display device, comprising:

a composite cover plate, comprising:

a plastic substrate, having a haze ranging from 10% to 30% and a thickness ranging from 50 μm to 250 μm;

a decorative layer, attached to a surface of the plastic substrate, the decorative layer having a thickness ranging from 16 μm to 24 μm and an optical density ranging from 1.5 to 2.5, wherein a peripheral area of the composite cover plate is defined by a vertical projection of the decorative layer;

a supporting layer comprising a first layer comprising poly carbonate (PC) and a second layer comprising polymethyl methacrylate (PMMA), the first layer having an upper layer surface and the second layer having a lower layer surface, wherein the upper layer surface is adhered to the plastic substrate and the decorative layer; and a shielding layer, attached to the lower layer surface and having an optical density in a range from 5.0 to 6.2, wherein the composite cover plate further has a viewable area connected to the peripheral area, and wherein the shielding layer is in contact with a sidewall of the first layer and a sidewall of the second layer;

a front light guide module, disposed on one side of the supporting layer away from the plastic substrate; and a display module, disposed on one side of the front light guide module away from the composite cover plate, when the front light guide module is turned on, luminance of the viewable area of the display device measured via the plastic substrate is within a range from 100 nits to 140 nits.

6. The display device as claimed in claim 5, wherein an L* of CIELAB color space of the peripheral area of the composite cover plate measured via the plastic substrate is within a range from 90 to 96.

7. The display device as claimed in claim 5, wherein the shielding layer has a thickness ranging from 6 μm to 20 μm.

8. The display device as claimed in claim 5, wherein the display module is an electronic ink display device or a cholesteric liquid crystal display device.

9. The display device as claimed in claim 5, further comprising a touch module, disposed between the composite cover plate and the display module.

10. The composite cover plate as claimed in claim 1, wherein:

the decorative layer comprises a third layer extending a first distance from an edge of the peripheral area toward the viewable area and a fourth layer underlying the third layer and extending a second distance from the edge of the peripheral area toward the viewable area, and the second distance is different than the first distance.

11. The composite cover plate as claimed in claim 10, wherein:

the second distance is less than the first distance.

12. The composite cover plate as claimed in claim 1, wherein:

the shielding layer comprises a third layer extending a first distance from an edge of the peripheral area toward the viewable area and a fourth layer underlying the third layer and extending a second distance from the edge of the peripheral area toward the viewable area, and the second distance is different than the first distance.

13. The composite cover plate as claimed in claim 1, wherein the shielding layer is in contact with a sidewall of the plastic substrate.

14. A composite cover plate, having a viewable area and a peripheral area located on at least one side of the viewable area and comprising:

a plastic substrate, having a haze in a range from 10% to 30% and a thickness ranging from 50 μm to 250 μm;

a decorative layer, attached to a surface of the plastic substrate, the decorative layer having a thickness ranging from 16 μm to 24 μm and an optical density ranging from 1.5 to 2.5, wherein the peripheral area of the composite cover plate is defined by a vertical projection of the decorative layer;

a supporting layer comprising a first layer comprising poly carbonate (PC) and a second layer comprising polymethyl methacrylate (PMMA), the first layer having an upper layer surface and the second layer having a lower layer surface, wherein the upper layer surface is adhered to the plastic substrate and the decorative layer; and a shielding layer, attached to the lower layer surface, the shielding layer having an optical density ranging from 5.0 to 6.2, wherein an L* of CIELAB color space of the peripheral area of the composite cover plate measured via the plastic substrate is within a range from 90 to 96, and wherein the shielding layer is in contact with a sidewall of the plastic substrate.

15. The composite cover plate as claimed in claim 14, wherein the peripheral area has a gloss ranging from 30 GU to 75 GU.

16. The composite cover plate as claimed in claim 14, wherein the plastic substrate has a pencil hardness ranging from 3H to 6H.

17. The composite cover plate as claimed in claim 14, wherein the shielding layer has a thickness ranging from 6 μm to 20 μm.

18. The composite cover plate as claimed in claim 14, wherein:

the decorative layer comprises a third layer extending a first distance from an edge of the peripheral area toward the viewable area and a fourth layer underlying the third layer and extending a second distance from the edge of the peripheral area toward the viewable area, and the second distance is different than the first distance.

19. The composite cover plate as claimed in claim 18, wherein:

the second distance is less than the first distance.

20. The composite cover plate as claimed in claim 14, wherein:

the shielding layer comprises a third layer extending a first distance from an edge of the peripheral area toward the viewable area and a fourth layer underlying the third layer and extending a second distance from the edge of the peripheral area toward the viewable area, and the second distance is different than the first distance.

* * * * *